United States Patent [19]

Suzuki et al.

[11] 4,304,482
[45] Dec. 8, 1981

[54] PHOTOGRAPHING INFORMATION SETTING DEVICE IN A CAMERA

[75] Inventors: Masayuki Suzuki, Kawasaki; Tadashi Ito; Fumio Ito, both of Yokohama; Hiroyashu Murakami, Tokyo, all of Japan

[73] Assignee: Canon Kabushiki Kaisha, Tokyo, Japan

[21] Appl. No.: 8,974

[22] Filed: Feb. 2, 1979

Related U.S. Application Data

[63] Continuation of Ser. No. 780,019, Mar. 22, 1977, abandoned.

[30] Foreign Application Priority Data

Mar. 30, 1976 [JP] Japan .................................. 51-34791

[51] Int. Cl.³ ............................................. G03B 17/00
[52] U.S. Cl. .................... 354/289; 354/23 D
[58] Field of Search ............... 354/23 D, 60 R, 60 A, 354/289

[56] References Cited

U.S. PATENT DOCUMENTS

| | | | |
|---|---|---|---|
| 3,928,858 | 12/1975 | Sakurada et al. | 354/23 D |
| 4,021,828 | 5/1977 | Iura et al. | 354/289 |
| 4,034,383 | 7/1977 | Mashimo et al. | 354/23 D |
| 4,037,233 | 7/1977 | Shinoda et al. | 354/23 D |
| 4,051,489 | 9/1977 | Saito et al. | 354/289 |

FOREIGN PATENT DOCUMENTS

2625004 12/1976 Fed. Rep. of Germany ... 354/23 D

*Primary Examiner*—Russell E. Adams
*Attorney, Agent, or Firm*—Toren, McGeady & Stanger

[57] ABSTRACT

A photographing information setting device of such system that a pulse generation means is provided and photographing information is set by pulses generated by opening and closing of a switch, being characterized by that a switch to place a photographing information setting circuit thereof in an activated state and a switch for photographing information setting are simultaneously handled by a single handling member.

5 Claims, 10 Drawing Figures

PHOTOGRAPHING INFORMATION SETTING DEVICE IN A CAMERA

This is a continuation of application Ser. No. 780,019 filed on Mar. 22, 1977 now abandoned.

DETAILED EXPLANATION OF THE INVENTION

The present invention relates to a setting device of photographing information such as shutter time, diaphragm aperture value, etc. in a camera, etc., particularly a photographing information setting device in which setting and change of information are done electrically by handling a push button switch and a slide switch, etc.

In a camera having an exposure control circuit, setting of photographing information at variable elements of the circuit was done conventionally by changing the positions of the variable elements which are associated with a mechanical information setting mechanisms for example such as a shutter dial, a diaphragm ring, etc. by manual handling of said mechanisms. Therefore for photographing, the above mentioned information setting mechanisms provided at a camera main body or a lens need to be respectively handled separately, thus it was inconvenient for rapid photographing.

The present invention is to provide a photographing information setting device being so made that said photographing information such as shutter time, diaphragm aperture value, etc. can be freely selected and set by handling for example a push button switch or a slide switch, etc. provided at a suitable place on a camera without using a mechanical setting means such as a shutter dial, a diaphragm ring, etc., and is characterized by actuating a main switch and switch to set photographing information by a same handling member, and thus prevention of forgetting to cut the main switch off and enhancing of handling characteristics can be secured.

Now, the present invention will be explained in detail referring to the drawings.

FIG. 3(a), (b), (c) are function explanation diagrams for the switch mechanism part shown in FIG. 2.

Figure 1:
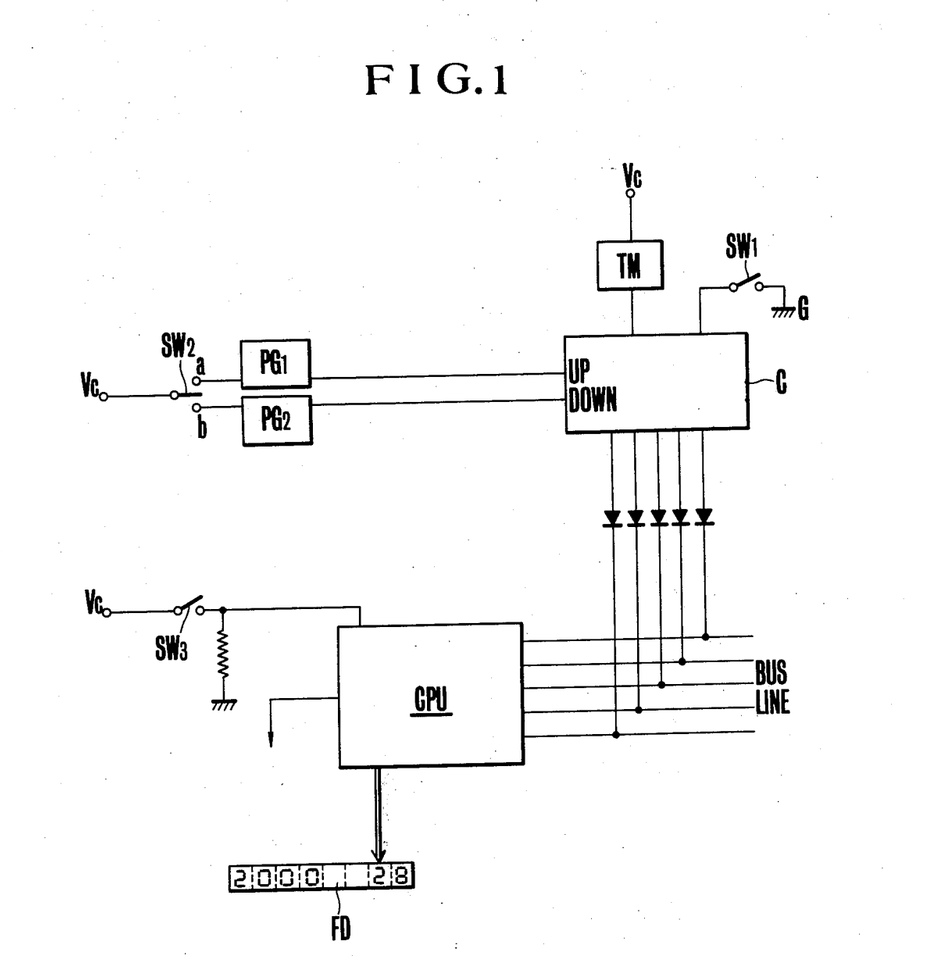
FIG. 1 is a circuit set up diagram of an example of a photographing information setting device according to the present invention.

In FIG. 1, what is shown as CPU is a central control circuit to control all the function, display and others necessary for photographing in a camera, and each mechanism part of a camera is activated by instructions from the same. What is shown as FD is a display part of the photographing information being set and computed. What is shown as $SW_3$ is a change over switch for such preference mode as a shutter preference photographing and a diaphragm preference photographing. What is shown as $SW_2$ is an electric switch to set photographing information and selects and sets photographing information as it is changed over to side a or side b. What are shown as $PG_1$, $PG_2$ are single pulse generators to generate single pulses when said photographing information setting switch $SW_2$ is connected. What is shown as $SW_1$ is a main switch. What is shown as C is an up down counter to conduct up count or down count by the pulses from said single pulse generators $PG_1$, $PG_2$ and the outputs therefrom are inputted into the CPU through a diode. What is shown as TM is a timer connected to the counter C to memorize and retain for a prescribed period of time the calculated value of the counter C even if the main switch $SW_1$ is OFFed.

Figure 2:
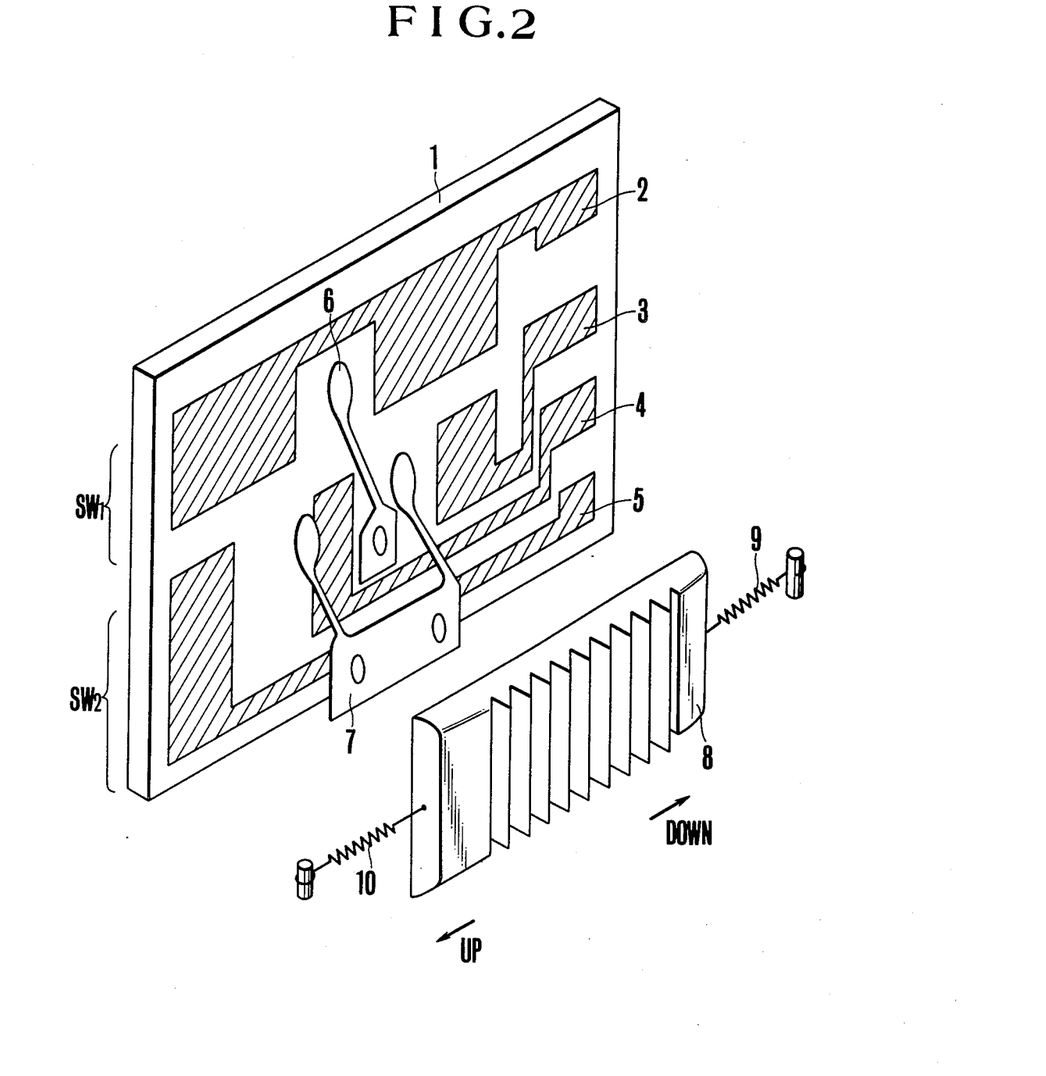
FIG. 2 is an oblique view of a switch mechanism part of the example shown in FIG. 1.

FIG. 2 is an oblique view of the mechanism parts of the switches $SW_1$, $SW_2$ of the example shown in FIG. 1. In the same drawing, what is shown as 1 is a base plate made of insulating type material. What are shown as 2, 3, 4, 5 are conductive parts on the base plate. What is shown as 8 is a handling member and is balancedly held in a constant place by springs 9, 10. What are shown as 6, 7 are first and second contacting pieces, respectively, being fixedly provided on said handling member 8. A main switch $SW_1$ is formed by the conductive part 2 and the first contacting piece 6, wherein said contacting piece 6 is grounded. The conductive parts 3, 4, 5 and the second contacting piece 7 form a photographing information setting switch.

FIG. 3(a), (b), (c) are function explanation diagrams for the switch mechanism part shown in FIG. 2.

Figure 3:
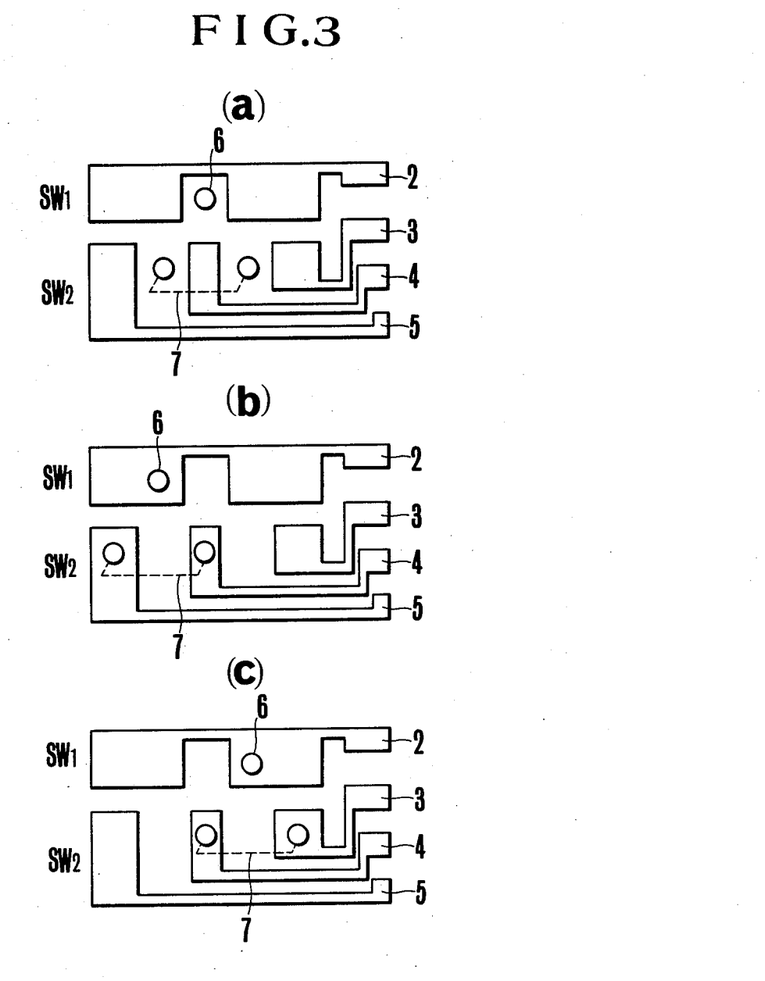

The function of a device shown in FIG. 1 to FIG. 3 are as follows. First, it is supposed that a shutter time preference mode is selected by the preference mode change over switch $SW_3$. When the handling member 8 is not handled at all, both switches $SW_1$, $SW_2$ are opened as shown in FIG. 3(a) by the balancing of said handling member 8 by the springs 9, 10. Now, when the handling member 8 is slided to UP side, first the first contacting piece 6 is made to contact the conductive part 2 and the main switch $SW_1$ is made ON, then the shutter time value being set at that time and the diaphragm aperture value obtained as a result of computation made to obtain appropriate exposure are displayed and the display part FD by the control circuit CPU. When the handling member 8 is further slided to UP side as shown in FIG. 3(b), the second contacting piece 7 connects the conductive parts 4 and 5 together and the photographing information setting switch $SW_2$ is connected to the side a. Therefore, single pulses are inputted from the single pulse generator $PG_1$ into the UP side terminal of the up down counter C, and said counter C counts one step to UP direction. That is, every time the handling member 8 is slided one time to UP side, the counter C makes up count by one step and the same is led from the output of the counter C to the control circuit CPU and a shutter time control mechanism (not being shown in the drawings) is shifted to longer time direction one step by one step by a direction from said circuit CPU. When a confirmation is made by the display part FD and the handling member 8 is stopped, the handling member 8 is returned to its original position by the springs 9, 10, and the main switch $SW_1$ becomes OFF, but the set shutter time is memorized and retained by the timer TM. Said one step can be set at every ½ stage or ⅓ stage, etc. of the shutter time or diaphragm. On the other hand, as the handling member 8 is slided to DOWN side after the main switch $SW_2$ becomes ON, the second contacting piece 7 connects the conductive parts 3, 4 together as shown in FIG. 3(c) and the photographing information setting switch $SW_2$ is connected to side b. Therefore, single pulses are inputted from the single pulse generator $PG_2$ into the down side terminal of the up down counter C, and said counter C counts by one step to the down direction. As the handling member 8 is actuated while confirmation is made at the display part FD, any desired shutter time can be obtained.

As a main switch and a photographing information setting switch are activated by a same handling member in a photographing information setting device according to the present invention as mentioned above, a main switch will not be left without being cut off when not in use by forgetting the same. Also since the shutter time or the diaphragm are set by an electric switch, complicated mechanically linked mechanism will not be necessary, thus errors and troubles can be reduced.

Figure 4:
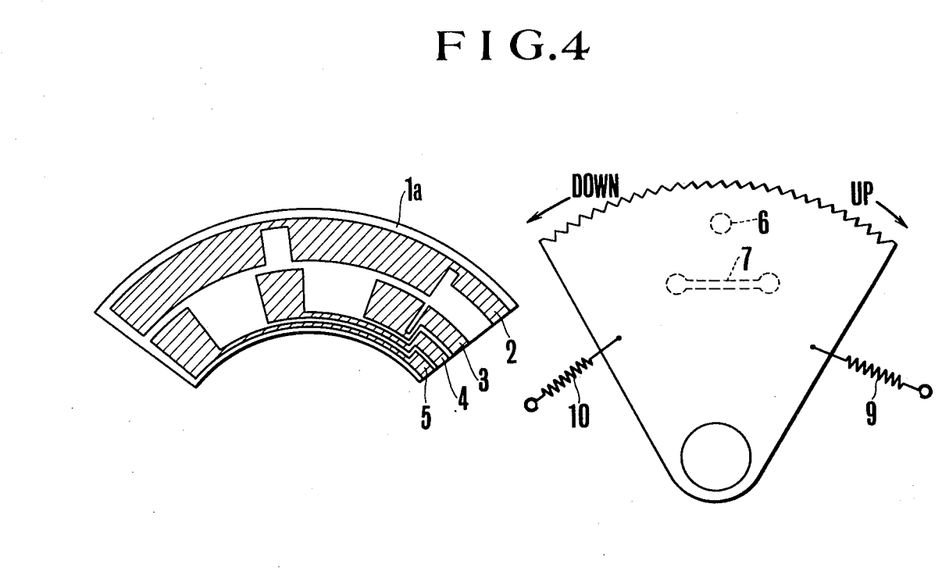
FIG. 4 is a front elevation of a modified example of a switch mechanism part.

FIG. 4 is a front elevation of a modified example of a switch mechanism part. The base plate 1a is of a sector shape in this example and the handling member 8 is also of a sector shape and rotates around an axle 8, wherein the function thereof is same as in the example shown in FIG. 2.

Figure 5:
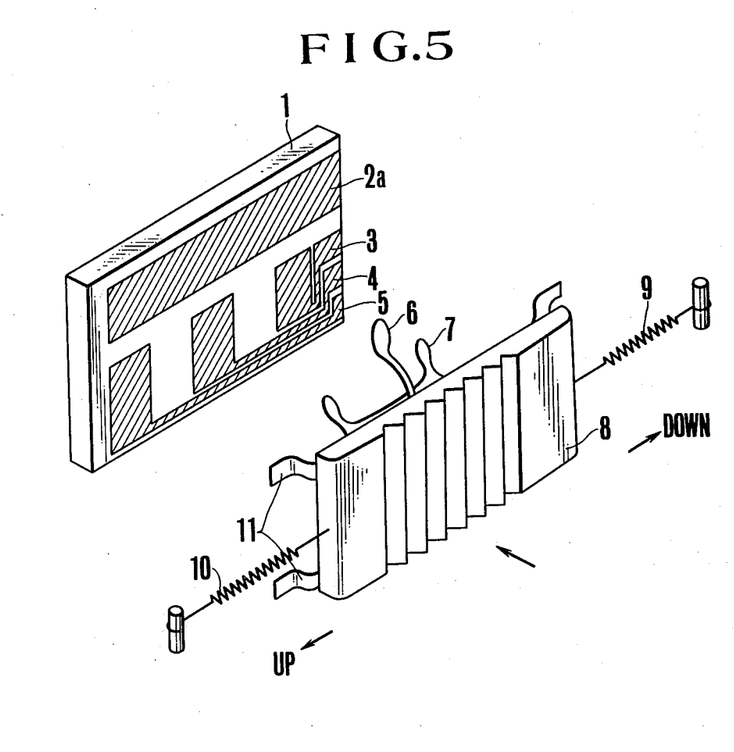
FIG. 5 is an oblique view of another modified example of a switch mechanism part.

FIG. 5 is an oblique view of another example of a switch mechanism part. In this example the conductive part 2a provided at the base plate 1 has a shape without any notched part as shown in the drawing. Further, springs 11 are provided at a handling member 8 and the contacting pieces 6, 7 of said handling member 8 are ordinarily in a state untouching with the base plate as said springs 11 contact the base plate 1.

In this set up as the handling member 8 is pressed the contacting piece 6 and the conductive part 2a come in contact with each other and a main switch becomes ON, further as the handling member is slided to UP or DOWN side, photographing information can be set as in the above mentioned cases.

Figure 6:
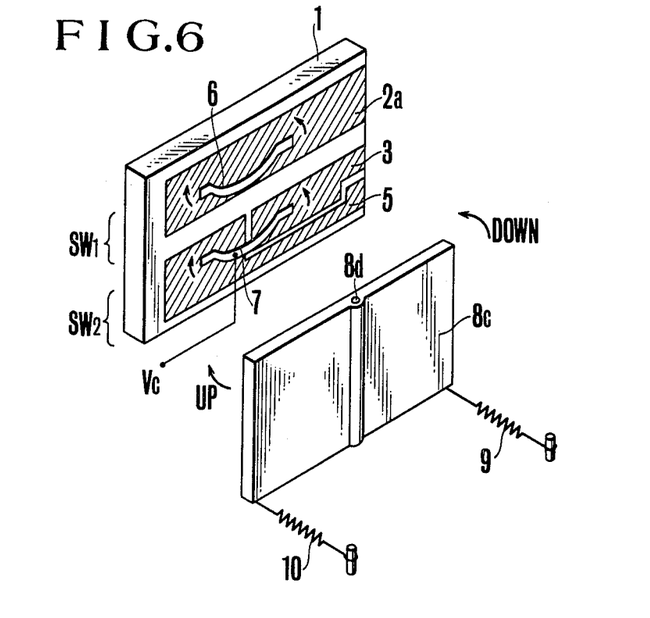
FIG. 6 is an oblique view of further another modified example of a switch mechanism part.

FIG. 6 is an oblique view of further another modified example of a switch mechanism part. In this example, conductive parts 2a, 3, 5 only are provided at a base plate 1. A handling member 8c is retained in place by springs 9, 10 and is rotatable around an axle 8d, and a first contacting piece 6 and a second contacting piece 7 are fixedly provided at the handling member 8c.

In this set up the handling member 8c is ordinarily balancedly retained by the springs 9, 10, therefore both the switches $SW_1$, $SW_2$ are opened. As the handling member 8c is rotated to UP direction, the first contacting piece 6 comes in contact with the conductive part 2a closing the main switch $SW_1$, further the second contacting piece 7 connected to Vc comes in contact with the conductive part 5 to close the photographing information setting switch $SW_2$ to side a. Also as the handling member 8c is rotated to DOWN direction the switch $SW_2$ will be closed to the side b. In this example the conductive parts constituting the switch $SW_2$ on the base plate are only two.

Figure 7:
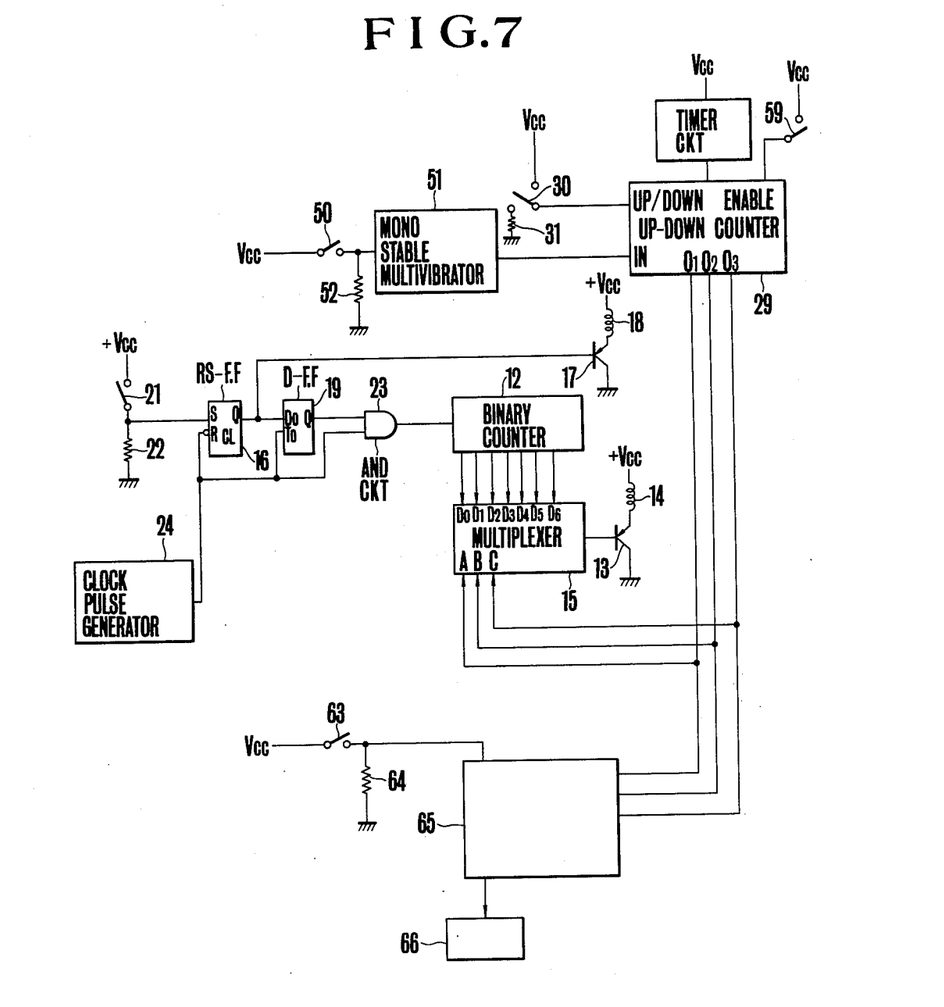
FIG. 7 and FIG. 8 are circuit diagrams to show other examples.
Figure 8:
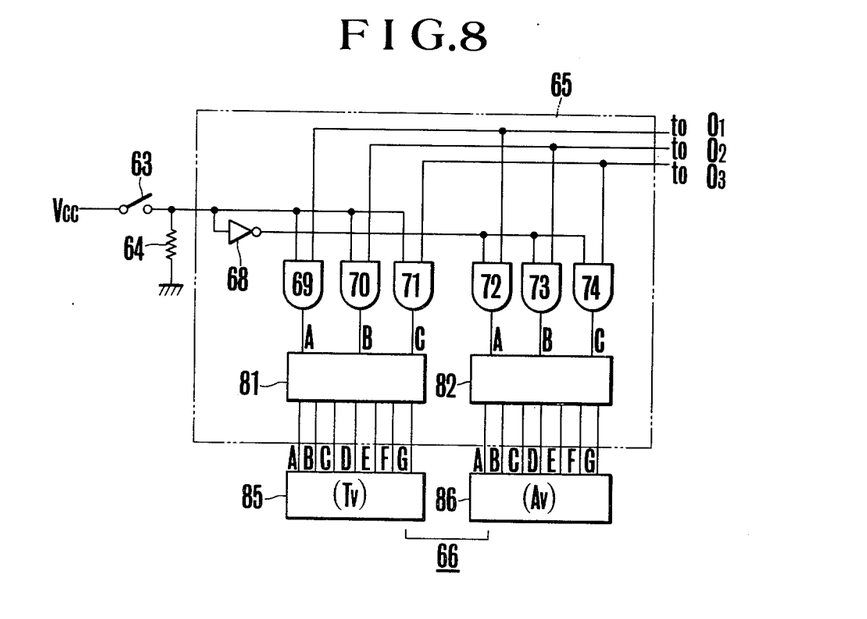

FIGS. 7 and 8 show other examples. In FIG. 7 what is shown as 50 is an information setting switch and is connected to an input terminal of a mono-stable multi-vibrator 51 through a differentiation circuit not being shown in the drawing, further an output terminal of said mono-stable multi-vibrator 51 is connected to an input terminal IN of an UP-DOWN counter 29. What is shown as 59 is a switch connected to an enable terminal of the counter 29, and what is shown as 30 is a switch to change over a counting direction. What is shown as 63 is a display mode change over switch having its one end connected to a positive terminal of battery Vcc and the other end thereof connected to a control circuit 65 having such elements as shown in FIG. 8 through a resistance 64, while what is shown as 66 is a display device.

A portion 65 enclosed by broken line in FIG. 8 forms a control circuit, and what is shown as $O_1$ is a terminal connected to a least significant bit of the counter 29 shown in FIG. 7, and said terminal $O_1$ is connected to one input terminal respectively of AND circuits, 69, 72. What is shown as $O_2$ is a terminal connected to a second stage of said counter 29 and is connected to one input terminal of AND circuits 70, 73, respectively. What is shown as $O_3$ is a terminal connected to a most significant bit of said counter 29 and is connected to one input terminal respectively of AND circuits 71, 74. What is shown as 68 is an inverter connected to a positive terminal of the battery Vcc through the switch 63, and an output terminal thereof is connected to AND circuits 72 to 74 connected to a decoder 82. On the other hand, the switch 63 is connected to AND circuits 69, 70, 71 connected to a decoder 81. Decoders 81, 82 have input terminals A, B, C, respectively. What is shown as 85 is a display device and has numbers to display exposure time (seconds) marked at a front plane of each luminous diode thereof. What is shown as 86 is a similar display device and has numbers to display diaphragm aperture values marked at front plane of each luminous diode thereof. What is shown as 21 is a switch connected to the positive terminal of the battery Vcc, and is associated with a release lever (not shown in the drawing) of a camera. What is shown as 22 is a resistance connected in series to the switch 21, and what is shown as 23 is an AND circuit having its one terminal connected to an output terminal of a display flip-flop and the other input terminal connected to an output terminal of a clock pulse generator 24. Said clock pulse generator 24 is of a publicly known type for example as shown in U.S. Pat. No. 3,748,979.

What is shown as 15 is a multiplier having data inputs $D_0$ to $D_6$ and data select terminals A, B, C, and for example, "SN54151A" being marketed by Texas Instruments Incorporated may be used as the same. What is shown as 12 is a binary counter being connected to an output terminal of AND circuit 23, and has seven stages, wherein each of said stages is connected to corresponding data inputs. For example the first stage thereof is connected to the data input $D_0$ of the multiplier 15 while the 7th stage thereof is connected to the data input $D_6$. What is shown as 13 in a pnp type transistor having its base electrode connected to an output terminal of the multiplier 15, and an emitter electrode of said transistor 13 is connected to the positive terminal of the battery through a coil 14 of an electromagnet to control a follower screen of a shutter. Here a digital exposure control device is formed by the above mentioned members 21, 22, 23, 29 and 12 to 19.

What is shown as 16 is a flip-flop having a set input terminal S, a reset input terminal R, and a clock terminal CL, and what is shown as 17 is a pnp type transistor, while what is shown as 18 is a coil of a magnet to retain a shutter leader screen (not shown in the drawing).

In the above mentioned circuit, an ENABLE terminal of the UP-DOWN counter 29 and an input terminal of the MONO-stable multi-vibrator 51 are respectively connected to the contacting piece 6 of the switch shown in FIGS. 2 and 3, and the positive terminal of the battery Vcc is connected to the conductive part 2 of said switch, while the UP/DOWN terminal of the UP-DOWN counter 29 is connected to the conductive part 4 of said switch, further a terminal connected to the resistance 31 of the counting direction change over switch 30 is connected to the conductive part 3, and the terminal at the battery Vcc side is connected to the conductive part 5.

In the above mentioned set up, when the switch handling member 8 is shifted to left direction in the drawing that is UP side, the contacting piece 6 comes in contact with the conductive part 2, then the switch 59 in the circuit of FIG. 7 is connected to Vcc side placing the counter 29 in a functionable state, and at a same time the conductive parts 4 and 5 are connected together by the contacting part 7, thereby the change over switch 30 in FIG. 7 is connected to Vcc side, placing the same in UP-counting.

Also, as the contacting piece 6 and the conductive part 2 are connected together, the switch 50 in FIG. 7 is closed, and the multi-vibrator 51 generates one pulse. Said pulse is inputted into the terminal IN of the counter 29 and the least significant bit of the counter 29 becomes "1," and the content of the counter 29 becomes (0, 0, 1). On the other hand, since the switch 63 is closed as a shutter speed is set at the counter 29, ones of the input terminals of the AND circuits 69 to 71 become "1." Therefore, the output of the AND circuit 69 only becomes "1," and the outputs of the other AND circuits all become "0." Said input state is decoded by the decoders 81, 82 and one of the luminous diodes of the display device 85 emits light to display corresponding shutter speed, for example, 1/512 (second). As the handling member 8 is returned to its original position and is slided again to UP side, the multi-vibrator 51 generates one pulse again. Therefore, the counter 29 counts up and the content thereof becomes (0, 1, 0) and the state at the input terminals A, B, C of the decoder 81 becomes (0, 1, 0). As a result, next luminous diode emits light to inform an operator that the content corresponding to exposure time of for example 1/256 (second) is set.

A shutter speed is set by repeatedly reciprocating the switch handling member 8 until the display of the display device 85 becomes a desired shutter speed.

Next, as a release button (not shown in the drawing) of a camera is pressed down, the switch 21 is closed, then the set input terminal S of the RS flip-flop 16 becomes "1." Therefore, the output terminal Q of the flip-flop 16 becomes "1" in synchronism with the fall of the clock pulse from the clock pulse generator 24. On the other hand, while the clock pulse is also impressed onto the clock terminal $T_0$ of the delay flip-flop 19, as the input terminal $D_0$ of said flip-flop 19 is "0" at this time, the output terminal Q of the flip-flop 19 is not changed to "1." Therefore the output of the AND circuit 23 does not become "1" and all stages of the counter 12 retain "0." On the other hand, since the pnp transistor 17 is converted to non-conductive state at a same time when the output terminal Q of the RS flip-flop 16 is converted to "1," the leader screen retention magnet is converted from a magnetized state to non-magnetized state. Therefore, the shutter leader screen runs to start exposure. And when next clock pulse is generated from a generator, the output terminal of the flip-flop 19 becomes "1" in synchronism with the rise of said clock pulse, therefore the output terminal of the AND circuit 23 becomes "1," and a pulse is impressed on the binary counter 12, while the first stage (least significant bit) of the counter 12 becomes "1" in synchronism the fall of said pulse, and the input terminal $D_0$ of the multiplier 15 also becomes "1." Here if the counter 29 is set at such value as corresponding to an exposure time of 1/256 (second) that is (0, 1, 0), the data select inputs of the multiplier 15 also becomes (0, 1, 0). Then next clock pulse is generated and as said clock pulse is inputted into the counter 12 through the AND circuit 23, the input terminal $D_1$ of the multiplier 15 only becomes "1" while the other inputs become "0." Therefore, the output terminal of the multiplier 15 is converted to "1," and the transistor 13 is converted to a non-conductive state. Therefore, the magnet retaining the shutter follower screen becomes demagnetized, and the follower screen runs completing exposure. That is the shutter is opened during such period of time as corresponding to the shutter speed set at the counter 29, and an appropriate exposure is obtained thereby. At this time the diaphragm aperture of the camera should naturally be set beforehand at such value as corresponding to a set shutter speed. When the switch handling member 8 is slided to DOWN side in FIG. 2, the switch 30 in FIG. 7 is placed in a state being connected to the resistance 31 side as the contacting piece 7 connects the conductor parts 3 and 4 together, and the switches 50, 59 are closed as in the above mentioned case thus DOWN count is done.

As has been explained above in a photographing information setting device according to the present invention, photographing information can be set at a desired modified mode by handling an up-down handling means for set information being provided at a suitable location of a camera in a simple manner, also since an information display means is provided it is a very convenient device for setting preference information at a time of photographing, thus the present invention has a great effect. Also, while the information setting device according to the present invention in the above mentioned example was explained for setting of preference photographing information (shutter time or diaphragm aperture value), the same can naturally be applied to the setting of other information than the above for example photographing date and so forth.

What is claimed is:

1. A photographic information setting device for a camera usable with a power source, comprising: a first switch, means connectable to the power source through the first switch to generate pulses, an UP-DOWN counter having photographic information set therein by said pulses, means to display the photographic information set at said UP-DOWN counter, a second switch to place said UP-DOWN counter in an activated state, and a single handling member to simultaneously handle said first switch and second switch.

2. A photographic information setting device of a camera, having a power source, means connected to said power source through a first switch to generate pulses, an UP-DOWN counter having photographic information set therein by said pulses, means to display the photographic information set at said UP-DOWN counter, a second switch to place said UP-DOWN counter in an activated state, and a single handling member to simultaneously handle said first switch and second switch.

3. A device according to claim 1 or 2, in which said second switch consists of an insulating type base plate and a conductive portion on the base plate as well as a first contacting piece at said single handling member, said first switch consists of at least two conductive parts and a second contacting piece at said handling member.

4. A device according to claim 3, in which said handling member is elastically retained and keeps said contacting pieces in a neutral position in a free state.

5. A device according to claim 1 or 2, in which said second switch to place the photographic information setting circuit in an activated state includes an insulating type base plate and a conductive portion on the base plate as well as a first contacting piece at said single handling member, said switch for setting photographic information includes at least two conductive parts and a second contacting piece at said handling member.

* * * * *